US006217976B1

(12) United States Patent
Macpherson et al.

(10) Patent No.: US 6,217,976 B1
(45) Date of Patent: Apr. 17, 2001

(54) EDGE DENSIFIED LUMBER PRODUCT

(75) Inventors: Gerald N. Macpherson, Woodland; Kendall H. Bassett, Tacoma, both of WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 09/425,747

(22) Filed: Oct. 22, 1999

(51) Int. Cl.[7] .......... B32B 3/08

(52) U.S. Cl. .......... 428/106; 428/114; 428/218; 428/192

(58) Field of Search .......... 428/106, 110, 428/114, 218, 537.1, 192

(56) References Cited

U.S. PATENT DOCUMENTS

| | | | |
|---|---|---|---|
| 1,465,383 | 8/1923 | Walsh et al. . | |
| 3,591,448 | 7/1971 | Elmendorf | 161/164 |
| 3,813,842 * | 6/1974 | Troutner | 52/693 |
| 3,956,555 | 5/1976 | McKean | 428/106 |
| 4,136,722 | 1/1979 | Travis | 144/317 |
| 4,199,632 | 4/1980 | Travis | 428/54 |
| 4,355,754 | 10/1982 | Lund et al. | 238/83 |
| 5,026,593 | 6/1991 | O'Brien | 428/215 |
| 6,001,452 | 12/1999 | Bassett et al. | 428/105 |

FOREIGN PATENT DOCUMENTS

WO 98/10157 * 3/1998 (WO) .

* cited by examiner

*Primary Examiner*—Alexander S. Thomas

(57) ABSTRACT

The invention is an edge densified lumber product of improved strength and stiffness and the method of its manufacture. The method is based on the parallel lamination of multiple plies of wood veneer. Narrow longitudinal reinforcing strips are laid along each edge of the veneer assembly between at least some of the veneer plies. Additional spaced apart veneer strips, about twice the width of the edge strips, are laid up at preselected locations in the mid-portion of the veneer assembly. These strips in the mid-portion are preferably spaced so that the distance between their centerlines corresponds to standard lumber widths. Appropriate adhesives are used to bond the assembly. The assembly is pressed to a uniform thickness so that the areas along the narrow veneer strips are densified relative to the adjacent portions. Longitudinal saw cuts are then made along the centerlines of the interior veneer strips to separate the assembly into multiple units of lumber. Bending strength and stiffness is significantly increased by having the densified areas along each edge of the resulting lumber units.

5 Claims, 7 Drawing Sheets

Fig 4
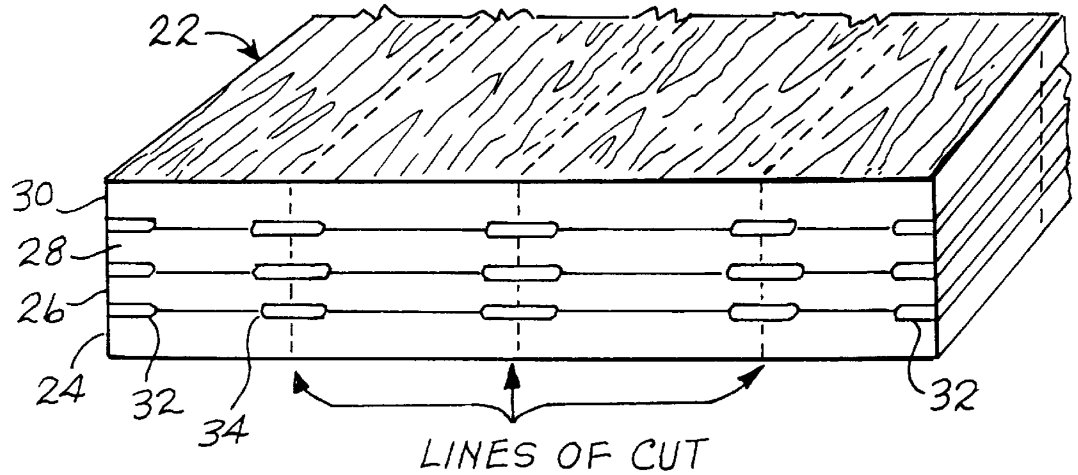
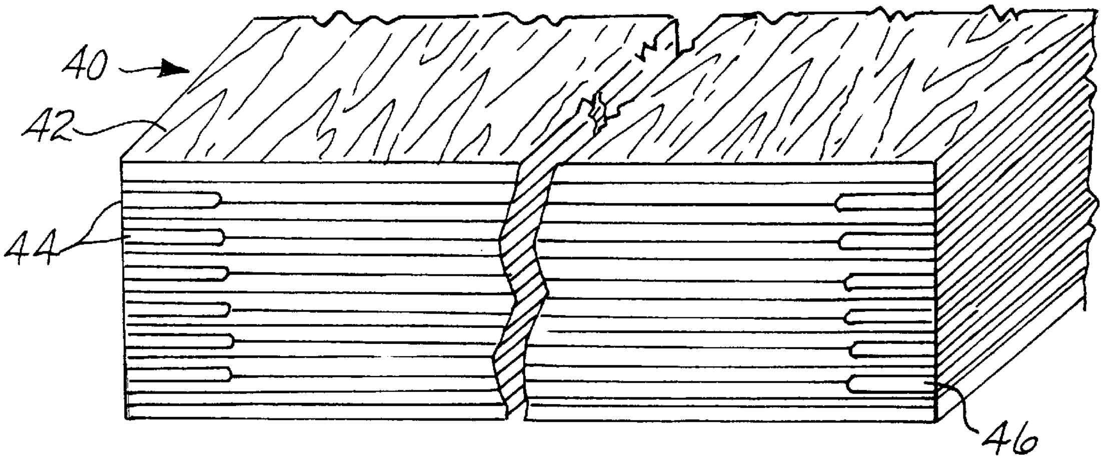
Fig. 5

EDGE DENSIFIED LUMBER PRODUCT

The present invention is directed to the method of making an edge densified lumber product formed from a plurality of parallel laminated veneer sheets. The invention is further directed to the lumber product formed by the method.

BACKGROUND OF THE INVENTION

Sawn lumber in standard dimensions is the major construction material used in framing homes and many commercial structures. The available old growth forests that once provided most of this lumber have now largely been cut. Most of the lumber produced today is from much smaller trees from natural second growth forests and, increasingly, from tree plantations. Intensively managed plantation forests stocked with genetically improved trees are now being harvested on cycles that vary from about 25 to 40 years in the pine region of the southeastern and south central United States and about 40 to 60 years in the Douglas-fir region of the Pacific Northwest. Similar short harvesting cycles are also being used in many other parts of the world where managed forests are important to the economy. Plantation thinnings, trees from 15 to 25 years old, are also a source of small saw logs.

Whereas old growth trees were typically between two to six feet in diameter at the base (0.6 m to 1.8 m), plantation trees are much smaller. Rarely are they more than two feet (0.6 m) at the base and usually they are considerably less than that. One might consider as an example a typical 35 year old North Carolina loblolly pine plantation tree on a good growing site. The site would have been initially planted to about 900 trees per hectare (400 per acre) and thinned to half that number by 15 years. A plot would often have been fertilized one or more times during its growth cycle, usually at ages 15, 20 and 25 years. At harvest the 35 year old tree would be about 40 cm (16 in) diameter at the base and 15 cm (6 in) at a height of 20 m (66 ft). Trees from the Douglas-fir region would normally be allowed to grow somewhat larger before harvest.

American construction lumber, so-called "dimension lumber", is nominally 2 inches (actually 1½ inches (38 mm)) in thickness and varies in nominal 2 inch (51 mm) width increments from 3½ inches to 11¼ inches (89 mm to 286 mm), measured at about 12% moisture content. Lengths typically begin at 8 feet (2.43 m) and increase in 2 foot (0.61 m) intervals up to 20 ft (6.10 m). Unfortunately, when using logs from plantation trees it is now no longer possible to produce the larger and/or longer sizes and strength grades in the same quantities as in the past.

There is another problem with plantation wood lumber that is not as generally recognized as are the tree size limitations. Typically, in plantation wood the average wood density is lower than old growth wood. This, in turn, affects strength and stiffness. Strength in flexure, otherwise termed modulus of rupture (MOR), and especially the stiffness measured as modulus of elasticity in flexure (MOE), may be lower and more variable than old growth wood. This is a problem for members used in a bending situation and it can be one for those members used in compression; e.g. longer wall studs. Typical of bending uses are floor joists, roof rafters, truss members, and headers over wide windows and doors, such as garage doors.

The problems noted above were outlined 20 years ago in a paper by A. Bendtsen *Forest Products Journal* 28 (10): 61–72 who noted the implications for construction lumber but offered no suggestions how to deal with them.

Since loblolly pine (*Pinus taeda* L.) and its closely related southern pines are particularly important timber species they will be used in the following discussion as a non-limiting example of coniferous trees in general. A frequently used unit related to density is specific gravity measured as oven dry weight/green volume. For loblolly pine, near the base of the tree specific gravity of the first several growth rings surrounding the pith will typically range around 0.38. By about age 20 the wood being formed near the bark at the same height will have a specific gravity of about 0.51–0.56. Density even of the outer mature wood portion of the tree varies longitudinally along the tree, being generally lower in the upper portions. Density of woods has been shown to correlate directly with stiffness, measured as modulus of elasticity in flexure. This variability has not been seriously taken into account in the manufacture of lumber products. Current sawmill procedures make no attempt to specifically deal with these inherent differences in density. The general assumption appears to have been that density variability was a factor which was not subject to any control.

Solid sawn wide dimension lumber is not without its own significant drawbacks. In particular, inconsistency in dry dimensions and strength properties and limited availability of long lengths are major deficiencies. Decrease in moisture content after installation causes shrinkage which is not consistent from piece to piece due to differences in grain orientation. This results in variability in dry width even though initial width was uniform. Particularly when the lumber is used as floor joists, inconsistent width from piece to piece results in poor conformation of sheathing or subfloor laid over the joists. This is a major contributor to the cause of annoying squeaks as people walk on the floor.

Lumber is graded visually by established rules that take into account many factors; i.e., knot size and placement, density, grain slope, manufacturing defects, etc. Any piece of lumber within a given grade is presumed to have some minimum stress rating. Unfortunately, the actual stress ratings of individual pieces within any one grade will vary considerably since the rules are established to ensure that the poorest piece will fall within grade.

Many approaches have been taken to engineer structural grade wood products to take the place of the larger and/or longer lumber sizes now in short supply. One successful approach is based on adhesively bonding a number of plies of rotary cut veneer. Unlike typical plywood products, the grain direction of all the plies is normally in the same direction. In one way of producing this product wide panels of appropriate thickness are ripped into pieces of standard dimension lumber width then finger jointed to the desired length. Other processes start with relatively narrower veneer sheets which can be butted end-to-end and continuously bonded to make units of almost any desired length, width, and thickness. The butt joints of adjoining plies are preferably staggered to prevent introducing points of weakness. This so-called laminated veneer lumber (LVL) has been in commercial production and use for a number of years, often as the tension members of trusses; e.g., as seen in Troutner, U.S. Pat. No. 3,813,842. It has the advantage that defects, particularly knots, do not run entirely through the piece as they do in sawn wood. This generally allows a higher stress rating for a LVL member of any given cross sectional dimensions. Other exemplary products of this type are described by Peter Koch, Beams from bolt-wood: a feasibility study, *Forest Products Journal,* 14: 497–500 (1964) and by E. L. Schaffer et al., Feasibility of producing a high yield laminated structural product, U.S.D.A. Forest Research Paper FPL 175 (1972).

Many combinations of veneer, solid sawn wood, and reconstituted wood such as engineered strandboard or flakeboard have also been explored for use as structural lumber products. Lambuth, in U.S. Pat. No. 4,355,754, shows a structural member in the form of an I-beam using a plywood web with solid sawn flange members. When used as a joist, this is presumably substitutable for sawn lumber of the same cross sectional dimensions. The web is friction fit and glued into tapered slots in the flange pieces. Other very similar constructions use composite wood strips such as oriented strandboard or flakeboard as the web member.

Barnes, in U.S. Pat. No. 5,096,765, notes the importance of stiffness (modulus of elasticity in flexure) (MOE) in lumber products. The product described uses splinters or strands of sliced veneer from 0.005–0.1 inch (0.13–2.5 mm) thick, at least 0.25 inches (6.4 mm) wide and at least 8 inches (203 mm) long. These must be free of any surface or internal damage and have their grain direction within 10° of the longitudinal axis of the product. After addition of adhesive the product is pressed to have "an MOE equivalent to a composite wood product having a MOE of at least 2.3 mm psi [$1.59\times10^7$ kpa] at . . . a density of 35 lbs/cubic foot".

In the above patent the inventor refers to his earlier U.S. Pat. No. 4,061,819 which teaches that the strength of wood composite products is density dependent; i.e., ". . . the higher [the] density generally the higher the strength of the product for the same starting materials". The earlier patent describes a very similar lumber-like product to the above having a modulus of elasticity approaching or reaching the MOE of clear Douglas-fir at various densities. Products similar to those described in the Barnes patents are now commercially available. However, the very high adhesive usage they require has a significant negative impact on cost of the products. Also, the strandwood products have significantly higher density than sawn lumber and are heavier to handle and more expensive to ship.

Many other patents teach the manufacture of clear wood members by various combinations of sawing and edge, end, and/or face gluing. Exemplary of these are U.S. Pat. No. 1,594,889 to Loetscher, U.S. Pat. No. 1,638,262 to Neumann, U.S. Pat. No. 2,942,635 to Horne, U.S. Pat. No. 5,034,259 to Barker, and U.S. Pat. No. 5,050,653 to Brown. Other workers have explored surface densification for various purposes. Exemplary of these are U.S. Pat. No. 3,591,448 to Elmendorf and U.S. Pat. No. 4,355,754 to Lund et al.

Compressed wood products have been known for many years. One commercially available product is formed of a plurality of thin parallel grain veneer sheets that have been impregnated with a thermosetting resin prior to compression. This product is limited to specialty uses, principally kitchen and table knife handles. Walsh et al. in U.S. Pat. No. 1,465,383, describe a cross laminated compressed wood product useful for pulleys and similar items. Travis, in U.S. Pat. Nos. 4,136,722 and 4,199,632 shows a tool handle made of parallel laminated veneer sheets. The veneer sheets at the tool attachment end of the handle are interleaved with additional narrow veneer strips. The product is then compressed to uniform thickness so that the tool attachment end is of significantly higher density than the residual portion of the handle.

An earlier development by some of the present applicants, published as PCT Application WO 98/10157, describes selective placement of the denser wood from the trees along the edges of lumber products where it enhances stiffness and bending strength.

Most of the products noted above have not found significant success for one or more reasons. There are exceptions, however. Laminated veneer lumber and edge and end glued pieces reassembled to produce clear boards or for use as door cores have been in commercial use for many years. Composite I-beams similar to those described in the Lambuth patent are now also widely available. One such product family manufactured by Trus Joist MacMillan, Boise, Id., is typical of the products which appear to have become an industry standard.

The composite I-beams have found considerable acceptance in the building industry where long spans, consistent dimensions, and known and dependable strength properties are required. However, they are not without their drawbacks. Their performance under common residential dynamic loads is not as good as solid sawn construction, due primarily to a lack of mass. As a result most builders use I-joists at a shorter than suggested span or at a reduced spacing. They cannot entirely be used as a replacement for sawn lumber. For example, they need reinforcing blocking to fill out the sides of the web to full width at many loading points. Their cross section essentially prevents side nailing and they present a major problem in attaching other members to the sides. Also, since the flange portions of the I-joist provides most of the stiffness it cannot be notched as is commonly done with solid sawn lumber. The nature of the geometry increases shear forces in the web member to higher values than are found in solid products of rectangular cross section.

It is notable in view of the highly heterogeneous nature of the smaller trees now available that the art has not more seriously heretofore addressed the problem of producing strong members of uniform and dependable properties from smaller plantation trees. The present invention overcomes the noted deficiencies in solid sawn lumber and composite I-beams. In addition, it results in a much higher utilization of the tree into useful lumber products.

SUMMARY OF THE INVENTION

The present invention is particularly directed to a method of manufacturing engineered structural wood products. These products are especially useful in critical applications such as joists, headers, and beams where predictable and higher stress ratings in edge loading may be required. The products have the advantage that they may be handled in the same fashion as solid sawn lumber. Strength properties are predictable and uniform. The products do not have the strength variability between and within individual pieces found in much visually graded solid sawn lumber. A major advantage of the present method is that it can be adapted for use in most plywood mills.

The method is based on lamination of multiple plies of wood veneers or strips which will typically range between 1–6 mm in thickness although thicker laminae are also suitable. In general the grain direction of all of the plies will be parallel although it is within the scope of the invention to include one or more interior laminae with a grain direction about 90° to the longitudinal dimension. Either sliced or rotary cut veneers are suitable but rotary cut veneers will generally be preferred. At some point these will be edge joined by one of the known processes so that dried veneer sheets having a precise predetermined width can be supplied. Additional narrow edge reinforcing strips are also provided. These will most typically be wood veneers of the same species but may be of a stronger species or of another reinforcing material; e.g. carbon or synthetic polymer fiber. The terms "strips, veneer strips, or reinforcing strips" should be considered sufficiently broad to include these alternative materials. One of the narrow strips is laid up along each longitudinal edge of a veneer sheet. In the preferred method of manufacture additional narrow strips will be laid up in parallel fashion at predetermined distances between the edge strips. These interior strips should be about twice the width of those used along the edges. Centerlines of the interior strips will relate to each other and to the outside edges in standard lumber dimensions; e.g. about 140, 190, 240 mm (5½, 7¼, 9¼ in), etc. or some optimum combination of these dimensions. The narrow veneer strips will ultimately be adhesively bonded on both faces to any veneer sheets with which they are in contact. The width of the narrow strips is not critical and will depend on the ultimate product characteristics desired. In general the strips used along the edges will be between about 25–50 nn (1–2 in) with about 35–40 mm (1½ in) being preferred. As just noted, the interior strips will be about twice this width.

A single veneer sheet laid up with the narrow strips as just described will be for convenience of description be termed a subassembly. Additional veneer sheets and/or subassemblies are then laid up above and/or below the initial subassembly to form a veneer assembly. One or both of any adjoining venwer faces will be adhesive coated. Preferred adhesives are phenolics, such as those normally used for plywood construction, or isocyanates, now widely used for bonding oriented strandboard products. Other commonly used durable wood adhesives such as resorcinol or melamine based types are also suitable.

The veneer assemblies are then placed in a press heated to a sufficient temperature for an adequate time to ensure permanent bonding. Temperature will depend on the particular adhesive used. The pressure used must be sufficient to compress the veneers in the locus of the narrow strips so that the ultimate product is of essentially uniform thickness. Typically a maximum pressure of about 4800–6200 kPa (700–900 psi) is sufficient.

After pressing, the resulting panels are then sawn longitudinally along the center lines of the interior strips to form an edge densified lumber product. The individual boards so produced may then be end jointed, if desired, to produce lumber in any required length.

While this will depend somewhat on the product width, the edge densified portions of the product will normally comprise less than about 50% of the product volume, more typically about 20%.

Where the terms "lumber products" or "lumber-like products" are used it should be understood these refer to wood products that can be used and handled like solid sawn lumber and are similar in general appearance.

It is a primary object of the present invention to provide a process for efficiently making edge densified lumber products.

It is a further object to provide lumber products having enhanced stiffness and bending strength from plantation wood trees.

It is also an object to provide a process for making edge densified lumber products using rotary cut or sliced veneers.

It is yet an object to provide a process for making edge densified lumber products that is readily amenable to automated production.

It is an object to minimize overall product weight by selectively densifying only the edge regions.

These and many other objects will become readily apparent upon reading the following Detailed Description taken in conjunction with the appended drawings.

BRIEF DESCRIPTION OF THE DRAWINGS

FIG. 4 shows in partial perspective a pressed veneer assembly (with considerable vertical exaggeration).

FIG. 5 shows in partial perspective a lumber product produced by the method.

DETAILED DESCRIPTION OF THE PREFERRED EMBODIMENTS

Figure 1A:
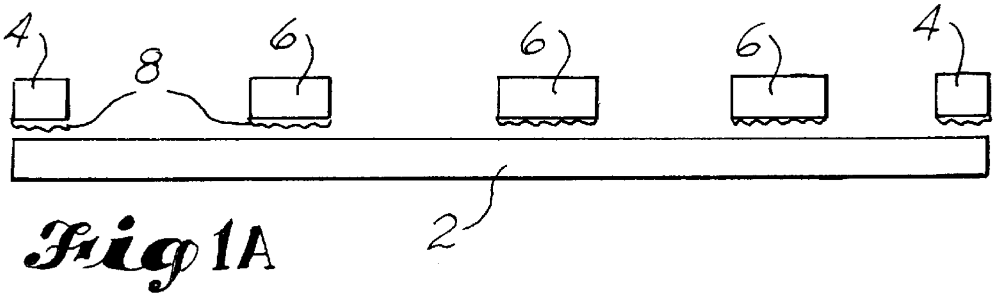
FIGS. 1A, 1B, and 1C represent in vertically exaggerated cross section alternative ways of preparing veneer subassemblies.
Figure 1B:
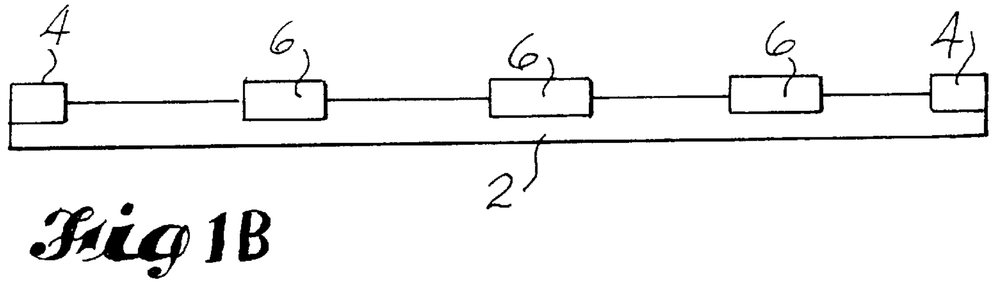
Figure 1C:
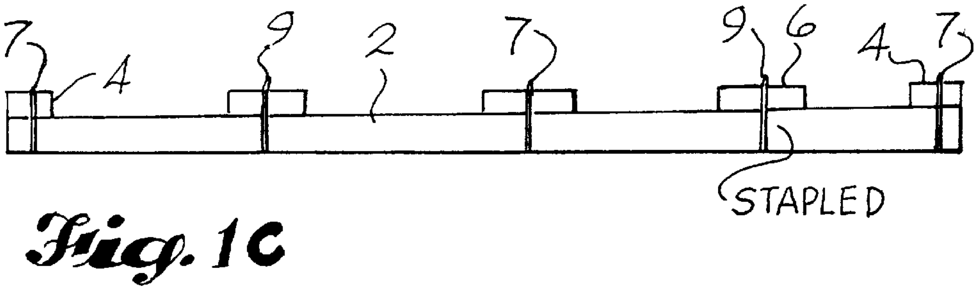

An understanding of the method and the configuration of some of the possible products is readily seen from reference to FIGS. 1A, 1B and 1C. Veneer sheets 2 are edge glued, stitched, or otherwise joined if necessary to provide fill width sheets; e.g., up to 4 ft in width, which are then trimmed to precise widths. Narrow veneer strips 4 are placed adjacent to each longitudinal edge of the veneer sheets and interior narrow veneer strips 6 are placed at desired intervals between and parallel to the edge strips 4. A layer of an appropriate adhesive 8 will serve to ultimately bond the narrow strips to the wide veneer sheet. This may be coated on the lower face of the narrow strips, as shown, on both faces of the narrow strips, or on the full upper surface of veneer sheet 2. The narrow strips may be tacked in place with a hot melt glue, stitched, or held with staples 7 as shown in FIG. 1C. Interior strips 6 will be about twice the width of edge strips 4. The narrow strips 4, 6 may be the same thickness as the larger veneer sheets 2 or may be of some different thickness. The combination of the plarality of narrow veneer strips with a single full sized sheet of veneer forms a subassembly. The narrow strips 4, 6 may simply be placed on the wide veneer sheet 2 and bonded later, they may be prebonded, or they may be prepressed as seen in FIG. 1B where both the narrow strips and underlying veneer sheet is compressed and densified in the locus of the narrow strips. The exact treatment will depend somewhat on the chosen process equipment and adhesive. Certain isocyanate adhesives; e.g., PMDI (polydiphenylmethane diisocyanate) are particularly advantageous since they have a very long open assembly time that permits coating only the back surface of the narrow strips at the subassembly stage. The subassemblies may then be fully coated with adhesive at a later time.

Figure 2:
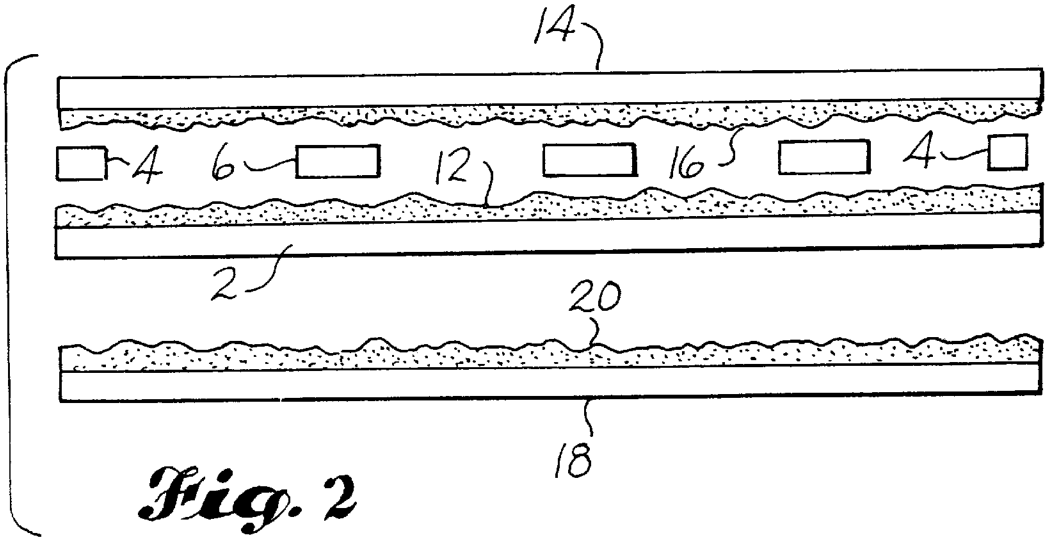
FIG. 2 shows in vertically exaggerated cross section a veneer assembly ready to be pressed.
Figure 3:
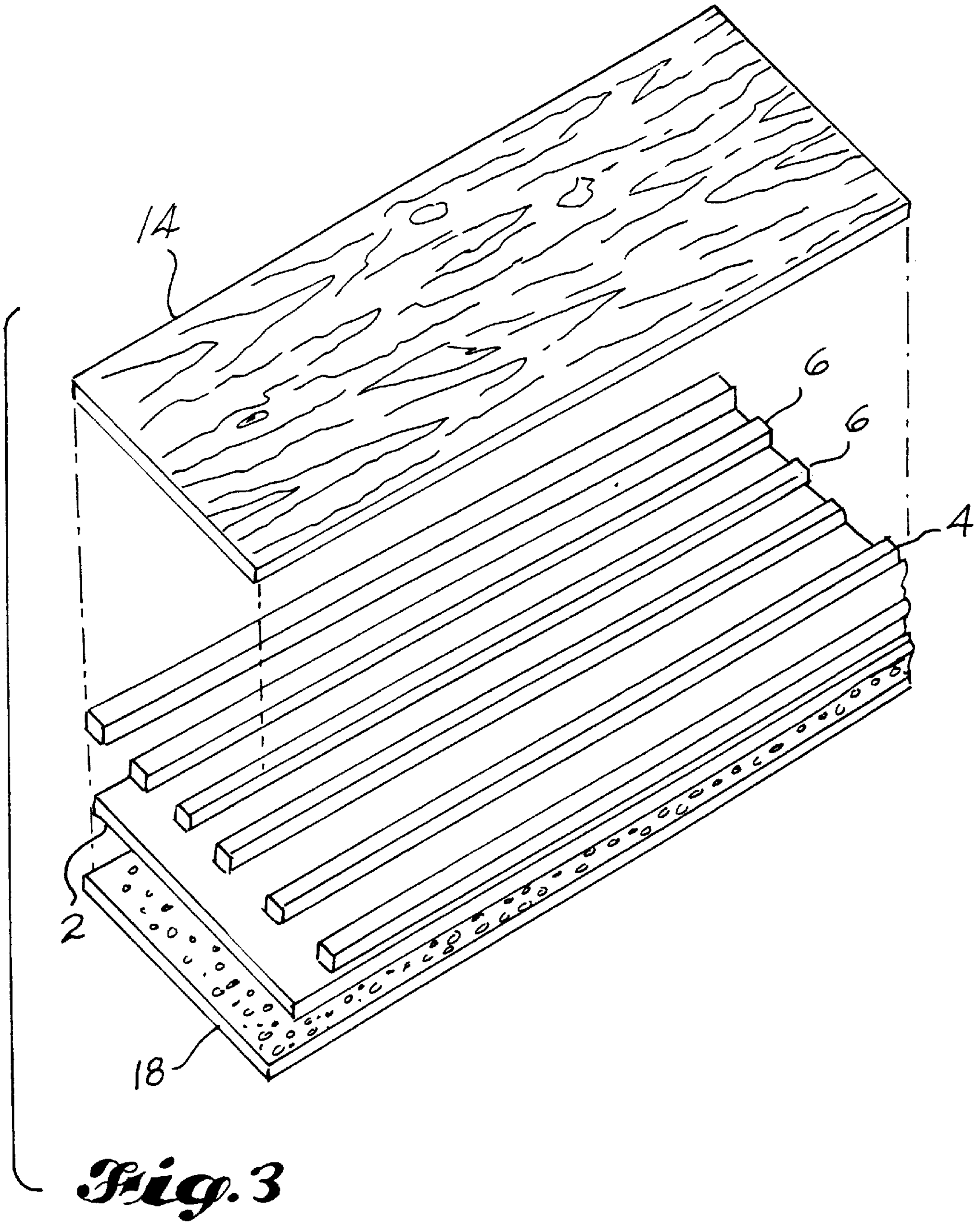
FIG. 3 shows in a horizontally compressed exploded perspective view a veneer assembly ready to be pressed.

Reference to FIGS. 2 and 3 show one possible product layup using a single subassembly. Scale in FIG. 3 is significantly exaggerated. A three ply product is represented for simplicity. Such a product is quite practical using thick veneers. However, preferred products will have additional laminae as will be subsequently shown. A single subassembly of veneer sheet 2 and strips 4, 6 is shown as an interior ply. In this case, the upper face of veneer sheet 2 has been uniformly coated with adhesive 12. An upper veneer sheet 14, coated on its lower face with adhesive 16, and a lower veneer sheet 18, coated on its upper face with adhesive 20, completes the assembly. After the assembly is laid up it is placed in an appropriate hot press to bond the components and densify the area in the locus of the narrow strips so that the resulting product is of essentially uniform thickness.

FIG. 4 represents a vertically exaggerated four ply assembly 22 in which three subassemblies and an additional veneer sheet have been pressed and densified in the areas along the narrow strips. It is ready to be cut into lumber products. Veneer sheets 24, 26, 28, and 30 have been interlaid with narrow edge strips 32 and interior strips 34 and pressed to a uniform thickness across the width of the product. Lines where longitudinal cuts to form individual boards will be made are shown along the center-lines of interior narrow strips 34.

FIG. 5 represents a multi-ply product 40 using fifteen veneer sheets 42, six of which are subassemblies with narrow veneer strips 44, 46 along the edges. This is a particularly useful configuration for a product made with a standard lumber thickness of 38 mm (1½ in) thickness using 2.5 mm (1/10 in) veneer. Thickness is uniform across the width but the density along the edges has been increased by about 40% over the uncompressed central portion.

Figure 6:
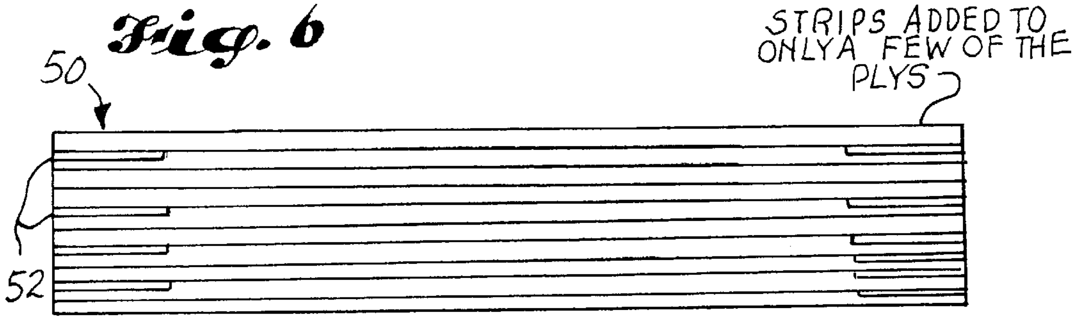
FIGS. 6–8 show in cross section alternative layups of the lumber products.
Figure 7:
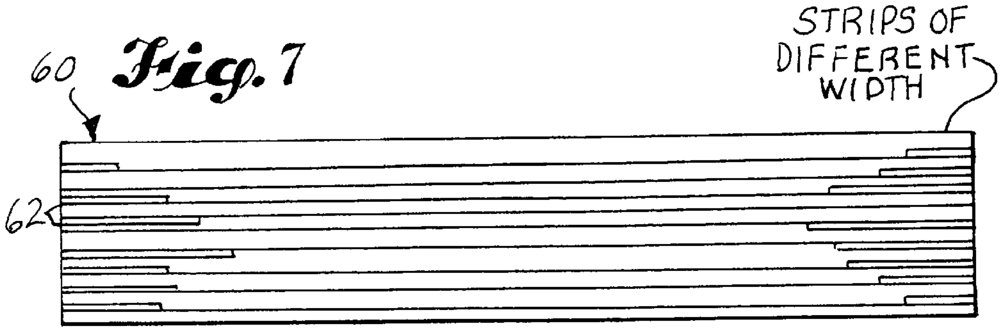
Figure 8:
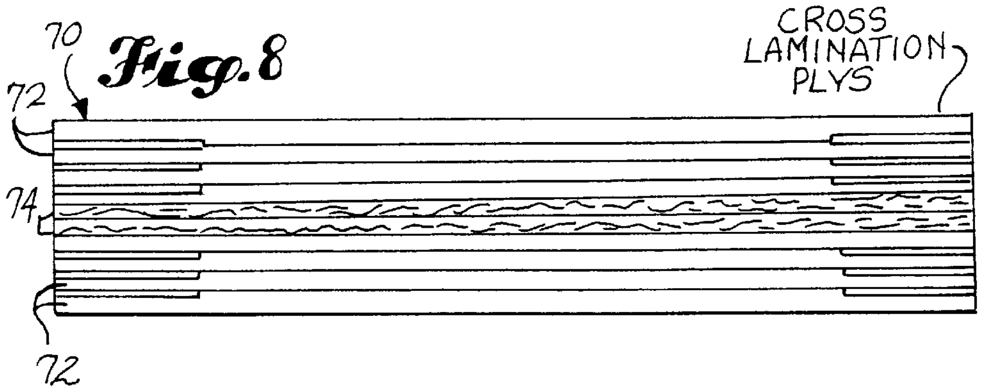

FIGS. 6–8 show some of the variations that can be made in construction of the products made by the present method. FIG. 6 is a product 50, similar to that of FIG. 5, in which the narrow strips 52 are of the same width throughout the thickness. This need not necessarily be the case. An illustration in FIG. 7 shows a gradually increasing width of the narrow strips 62 toward the center of the product 60. FIG. 8 shows a construction 70 that is particularly advantageous from the standpoint of product dimensional stability. Outer veneer sheets 70, 72 on both faces have their grain direction oriented longitudinally, as has been the case with all of the examples described to the present. However, there are two central sheets 74 with their grain oriented 90° or transverse to the longitudinal axis. This may be done to increase lateral dimensional stability in a moist environment since wood is known to expand much less parallel to the grain than it does perpendicular to the grain. These transverse sheets need not be adjacent and the number, if they are used at all, is not limited to two but may be one or more.

EXAMPLE

Nominal 0.1 in (2.5 mm) western hemlock veneer was used to form a 16 foot (4.88 m) panel 25½ inches (648 mm) wide with a finished thickness of 1.5 inches (38 mm). Individual veneer sheets were clipped to a 25.5 in (648 mm) width and 101 inch (2565 mm length). The veneer was dried to approximately 5% moisture content. Weighted input veneer MOE was $1.73 \times 10^6$ psi ($1.19 \times 10^7$ kPa) and the weighted density was 25.88 lb/ft$^3$ (41.46 kg/m$^3$). The assembly was made of seventeen layers of full width veneer. Four densification strips 2 inches (51 mm) wide were placed along one edge and a similar number of strips 3½ inches (89 mm) wide were placed in the interior with center lines of the interior strips about 10 inches (250 mm) from the edge of the assembly. The densification strips were placed between veneer sheets 1 and 2, 5 and 6, 12 and 13, and 16 and 17. The adhesive used was 6% PMDI based on total assembly weight. Geometry of the panel is more readily understood by reference to FIGS. 9 and 10. The assembled panel was then placed in a hot press under a maximum pressure of 5520 kPa (800 psi) at a temperature of 190° C. (375° F.) for 30 minutes followed by a 10 minute three-stage decompression cycle.

Figure 9:
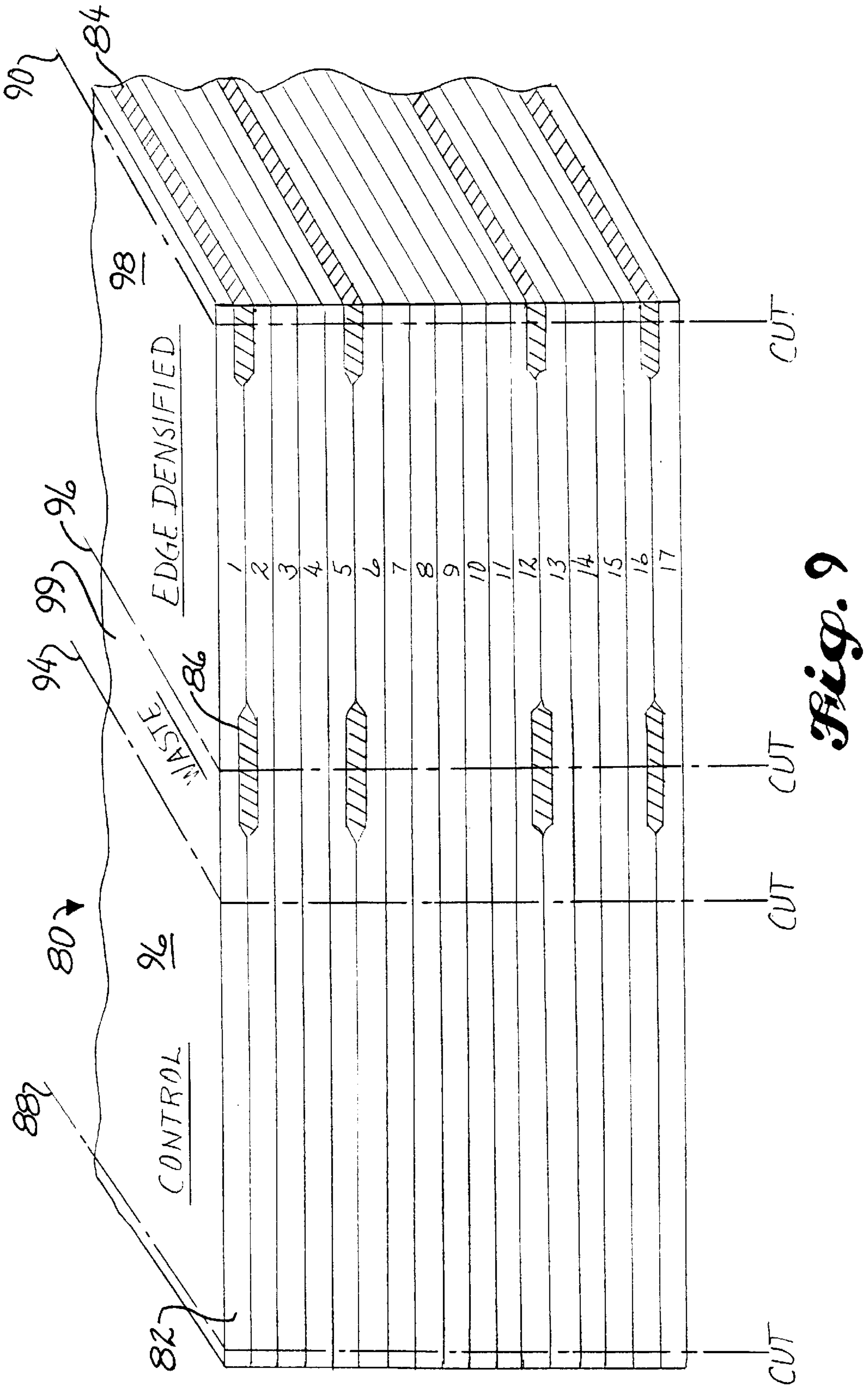
FIG. 9 is a partial perspective end view, with considerable vertical exaggeration, of an experimental panel for producing an edge densified lumber product and a comparison control sample.

FIG. 9 is a partial perspective end view of the test panel with considerable vertical exaggeration. Seventeen veneer sheets 82 were laid up one on the other. The four narrow edge strips 84 and four interior strips 86 were placed to form subassemblies as described above and shown in the figure. After pressing, narrow trim strips were taken off each edge along cut lines 88, 90. Further cuts were made along cut lines 92 and 94 to produce boards 96, 98 which were 9¼ inches (235 mm) wide, 1½ inches (38 mm) thick, and 16 feet (4.88 m) long. Piece 99 cut out of the center of the panel was considered waste for purposes of the present example. Board 98 is an edge densified product while board 96 is a control sample without edge densification.

Figure 10:
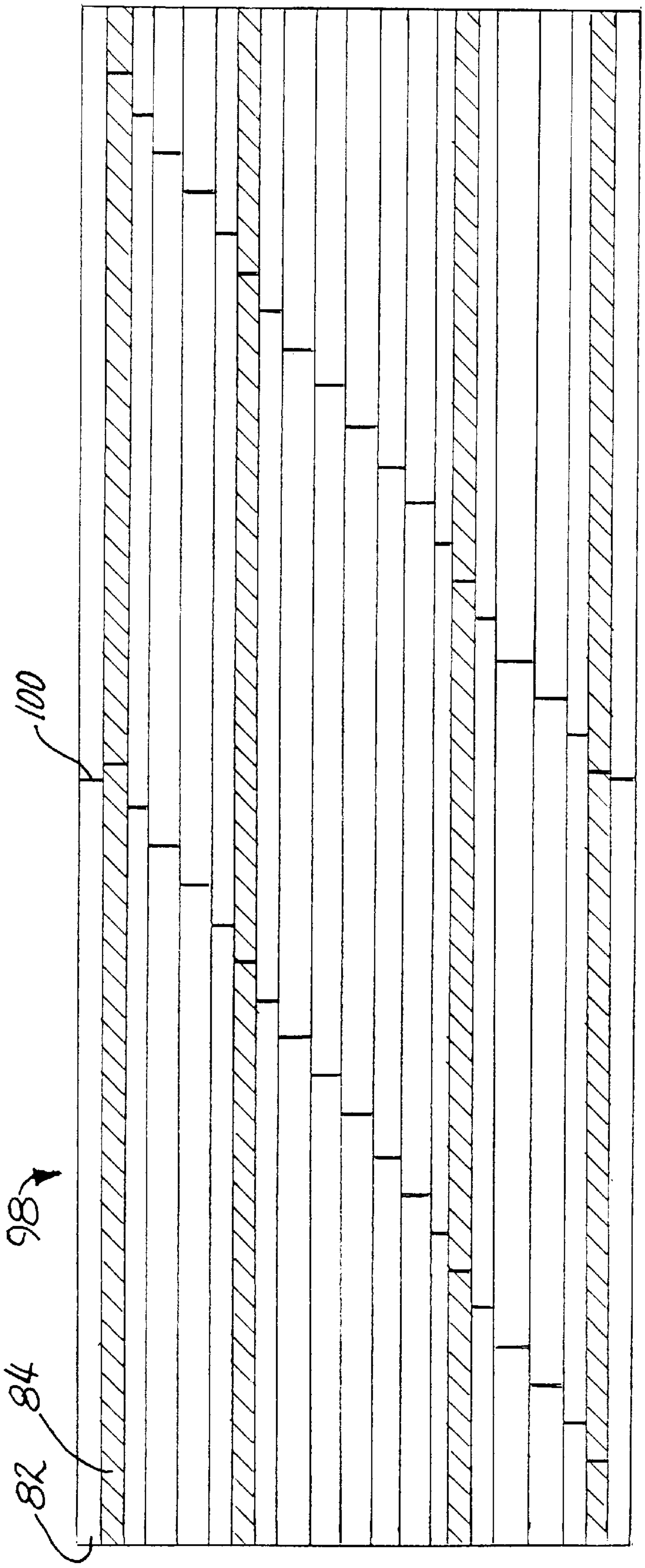
FIG. 10 is a longitudinal edge view of the right hand edge of the panel of FIG. 9, again with considerable vertical exaggeration.

FIG. 10 shows a longitudinal edge of board 98, again with considerable vertical exaggeration. Since the veneer sheets were only slightly longer than half the length of the ultimate products it was necessary to make end joints along lines 100. These were staggered along the length as shown in the figure. End joints were formed by overlapping adjacent veneer sheets by about 25 mm.

The control and edge densified boards were tested for stiffness and strength with load applied both to the edge (as a joist) and face (as a plank). Results are shown in the following table.

| | Density, | Load applied as plank | | Load applied as joist | |
|---|---|---|---|---|---|
| Sample | kg/m$^3$ | MOE, kPa | MOR, kPa | MOE, kPa | MOR, kPa |
| Control | 51.26 | $1.28 \times 10^7$ | — | $1.32 \times 10^7$ | $5.44 \times 10^4$ |
| Edge Densified | 54.63 | $1.43 \times 10^7$ | — | $1.50 \times 10^7$ | $6.36 \times 10^4$ |

The gain in strength and stiffness of the edge densified product is significant and cannot be accounted for by the slightly increased overall density. By comparison, solid sawn hemlock lumber of dimensions equivalent to the test samples, loaded as a joist, has an MOE that generally falls within the range between about $1.1 \times 10^7$ and $1.5 \times 10^7$ kPa The edge densified product clearly falls at the high end of this range while the control sample falls at about the average value.

Figure 11:
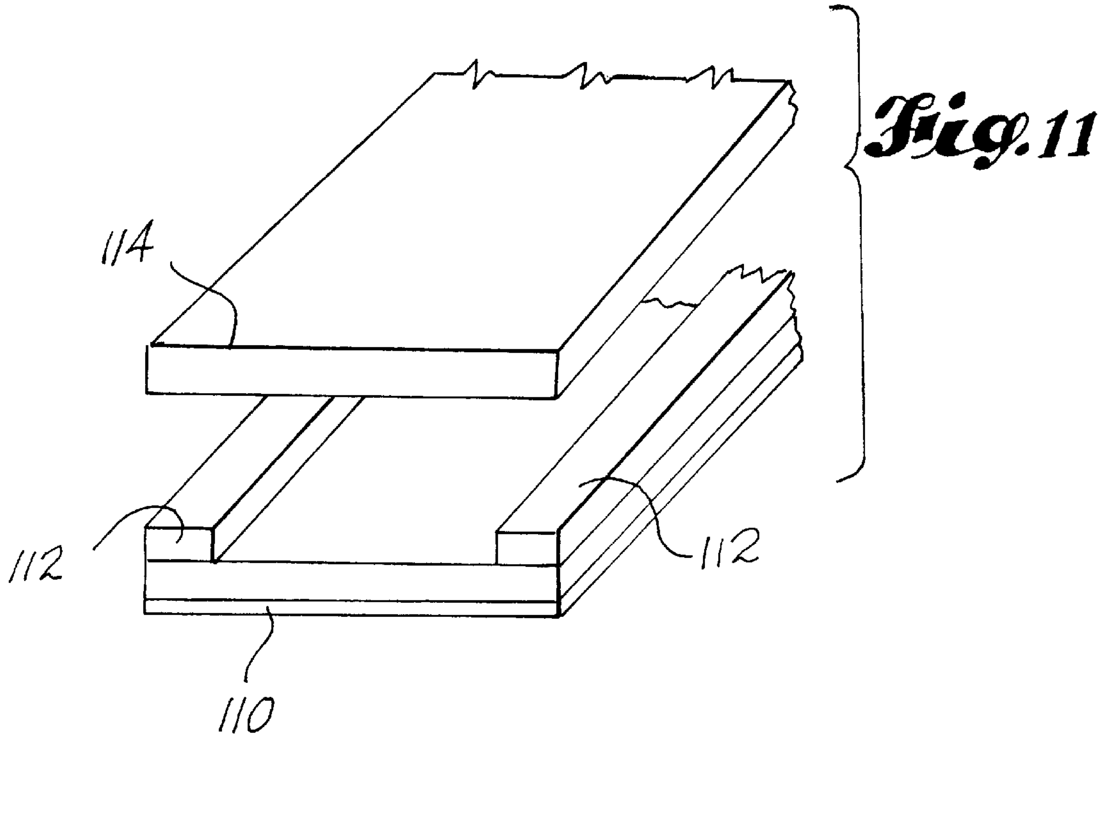
FIG. 11 shows an alternative construction in which only two reinforcing strips are used.

FIG. 11 shows an alternative method of construction in which a product of lumber width is being initially formed. This uses one or more base sheets 110 and employs one veneer strip 112 along each edge and but omits the interior strips. A top sheet 114 completes the assembly. Additional sheets 110 and strips 112 may be laid up one on toop of the other until a desired final product thickness is obtained. The veneer sheets would initially be clipped to the approximate width of the desired lumber product, allowing only a slight excess for trimming after pressing.

It will be apparent to those skilled in the art that many variations can be made, both in the product and its method of manufacture, that have not been described here. These are regarded as being fully within the scope of the invention if encompassed by the following claims.

What is claimed is:

1. An edge densified laminated veneer lumber product having a length, width, and thickness which comprises a plurality of adhesively bonded veneer laminae extending the full width and length of the product, said product being of rectangular cross section with edge and central portions, the product having at least one narrow reinforcing lamina interleaved along the full length of each edge portion so that there are a greater number of veneer laminae along the edge portions than are present in the central portion, said product having been compressed to an essentially uniform thickness so that the edge portions have a higher density than the central portion.

2. The edge densified lumber product of claim 1 in which the densified edge portions constitute less than about 50% of the volume of the product.

3. The edge densified lumber product of claim 2 in which the densified edge portions constitute less than about 20% of the volume of the product.

4. The edge densified lumber product of claim 1 in which the grain orientation of all the laminae is parallel.

5. The edge densified lumber product of claim 1 in which at least one interior lamina has a grain angle oriented approximately 90° from the other laminae.

* * * * *